(12) United States Patent
Kirschenbuhler et al.

(10) Patent No.: US 7,753,238 B2
(45) Date of Patent: Jul. 13, 2010

(54) VOLUME MEASUREMENT AND/OR METERING DEVICE AND METHOD FOR OPERATING A VOLUME MEASUREMENT AND/OR METERING DEVICE

(75) Inventors: Peter Kirschenbuhler, Herisau (CH); Bjorn Christensen, St. Gallen (CH)

(73) Assignee: Metrohm AG, Herisau (CH)

( * ) Notice: Subject to any disclaimer, the term of this patent is extended or adjusted under 35 U.S.C. 154(b) by 541 days.

(21) Appl. No.: 11/674,460

(22) Filed: Feb. 13, 2007

(65) Prior Publication Data
US 2007/0194055 A1 Aug. 23, 2007

(30) Foreign Application Priority Data
Feb. 21, 2006 (EP) .................................. 06110193

(51) Int. Cl.
*B67D 7/58* (2010.01)
(52) U.S. Cl. ................... 222/383.1; 222/1; 222/144; 222/144.5; 222/330; 222/333; 422/100
(58) Field of Classification Search ............... 222/52, 222/63, 144, 144.5, 132, 129, 383.1, 330–331, 222/367–368, 380–381, 333, 548, 372, 162, 222/163, 167, 366, 504, 1; 73/864.18, 864.16, 73/864.17; 422/100
See application file for complete search history.

(56) References Cited

U.S. PATENT DOCUMENTS

| | | | | |
|---|---|---|---|---|
| 1,609,676 A | * | 12/1926 | Vetter ........................ | 222/129.3 |
| 1,925,962 A | * | 9/1933 | Hoyer ........................ | 222/142.9 |
| 2,872,082 A | * | 2/1959 | Neugebauer ................. | 222/249 |
| 4,380,307 A | * | 4/1983 | Stillinger ..................... | 222/142.9 |
| 4,705,192 A | * | 11/1987 | Knapton ..................... | 222/144.5 |
| 5,062,547 A |   | 11/1991 | Zahner et al. | |
| 5,626,260 A | * | 5/1997 | Waldner ....................... | 222/144 |
| 7,228,991 B2 | * | 6/2007 | Barraclough ............... | 222/144.5 |

FOREIGN PATENT DOCUMENTS

| | | |
|---|---|---|
| EP | 399497 | 2/1995 |
| JP | 60-88267 | 6/1985 |
| JP | 64-5119 | 1/1989 |

\* cited by examiner

*Primary Examiner*—Frederick C. Nicolas
(74) *Attorney, Agent, or Firm*—Shoemaker and Mattare

(57) ABSTRACT

A volume measurement and/or metering device includes a cylinder/piston and cock system for sucking in and/or discharging liquids in a defined way, the piston being movable in relation to the cylinder for sucking in or discharging the liquid. The cylinder is mounted, together with the cylinder bottom, rotatably with respect to the cock system about an axis of rotation parallel to the cylinder longitudinal axis. The cylinder bottom bears with a sealing seat against a cock element of the cock system, the cock element having at least one duct orifice. These orifices are arranged in such a way that the at least one orifice in the cylinder bottom can be brought into congruence with the orifices of the cock element when the cylinder and the cylinder bottom are rotated. Further, the cock element is brought into a sealing closing position for simultaneously closing of all the orifices of the cylinder bottom are provided.

8 Claims, 3 Drawing Sheets

VOLUME MEASUREMENT AND/OR METERING DEVICE AND METHOD FOR OPERATING A VOLUME MEASUREMENT AND/OR METERING DEVICE

The present invention relates to a volume measurement and/or metering device for liquids and to a method for operating a volume measurement and/or metering device.

BACKGROUND OF THE INVENTION

A volume measurement and metering device is known from EP 399 497. The device has a cylinder/piston and cock system. With this device, liquid can be sucked in or discharged in a defined way. The cock system comprises a cock element with at least two ducts which can be connected to an orifice in the cylinder bottom. Depending on the choice of the orifice, liquid can be sucked in from various containers or be discharged into various containers.

The volume measurement and metering device described above has some disadvantages. For example, the meterable material in the cylinder may become contaminated, in that water, oxygen, carbon dioxide, etc., diffuse out of the surroundings into the cylinder along a metering path. Further, the hydrostatic pressure occurring in each position of the cock element may lead to load being exerted on the cylinder/piston system and may adversely influence the metering accuracy.

SUMMARY OF THE INVENTION

The object of the present invention is, therefore, to overcome the disadvantages of the known device and, in particular, to provide a device in which the metering accuracy can be preserved and the meterable material remains as far as possible free of contamination.

This object is achieved by means of a volume measurement and/or metering device and a method for operating a volume measurement and/or metering device as described below.

The volume measurement and/or metering device has a cylinder/piston and cock system for sucking in and/or discharging liquids in a defined way, the piston being movable in relation to the cylinder for sucking in or discharging the liquid. The cylinder is mounted, together with the cylinder bottom, rotatably with respect to the cock system about an axis of rotation parallel to the cylinder longitudinal axis. The cylinder bottom bears with a sealing seat against a cock element of the cock system, the cock system having at least one duct orifice. These orifices are arranged in such a way that the at least one orifice in the cylinder bottom can be brought into congruence with the orifice or orifices of the cock element when the cylinder and cylinder bottom are rotated. According to the invention, means for the simultaneous closing of all the orifices of the cylinder bottom are provided.

By all the orifices of the cylinder bottom being closed, no foreign substances can diffuse into the meterable material. Contamination of the meterable material is therefore greatly restricted. Moreover, the hydrostatic pressure also remains stable when the cylinder contents are closed off from the external surroundings. Thus, no addition forces act on the piston, and measurement accuracy is maintained. Further, a plurality of components may be sucked into the cylinder which must then assume a chemical or physical equilibrium. When all the orifices of the cylinder bottom are closed, environmental influences on the mixture can be avoided. The mixture thus assumes an equilibrium in an undisturbed way.

Preferably, the cylinder bottom and the cock element consist of ceramic. However, other materials, such as glass or plastic, may likewise be envisaged.

In a particularly preferred embodiment, all the orifices of the cylinder bottom are closed by the cock element in at least one predetermined settable position of the cock system. This at least one settable position is designated, further, as a closing position. Depending on the nature and material of the cylinder bottom and of the cock element, it is expedient if the cock element has, in the closing position, additional sealing means for sealing off each orifice of the cylinder bottom.

What is particularly advantageous in this embodiment is that the closing mechanism requires per se no additional elements which would increase the dead volume of the device. Moreover, the handling of the device is very simple, since no additional elements have to be activated. In this embodiment, therefore, the dead volume is almost zero.

Preferably, a control arrangement for the controlled setting of the positions of the cock element is provided. The control arrangement is designed in such a way that, by means of a control command, a closing position or another predetermined position of the cock element, depending on the command, can be set. Particularly advantageously, the device has, further, a measurement arrangement for determining the at least one closing position of the cock element. The measurement arrangement may be, for example, a Hall sensor which checks whether the cock element is in the closing position. Particularly advantageously, each position of the cock element which can be assumed, as intended, has a specific Hall sensor.

In a further embodiment the orifices are arranged asymmetrically in the cock element. It has proved particularly advantageous if, around the closing positions, a greater spacing is implemented in the cock element than between the individual ducts. This ensures with greater certainty that the cock element reliably closes the orifices in the cylinder bottom.

In an alternative embodiment, a separate valve is provided for closing the at least one orifice in the cylinder bottom. Particularly advantageously, the valve is introduced directly in the cylinder bottom, so that as little dead volume as possible is generated.

Further, the present invention comprises a method for operating a volume measurement and/or metering device with a cylinder, piston and cock system for sucking in and/or discharging liquids in a defined way. The piston is moved in relation to the cylinder for sucking in or discharging the liquid. The cylinder is mounted, together with the cylinder bottom, rotatably with respect to the cock system about an axis of rotation parallel to the cylinder longitudinal axis. The cylinder bottom bears with a sealing seat against a cock element of the cock system having at least one duct orifice. An orifice may be envisaged, for example, when a liquid is to be pipetted from one vessel into another.

In a first step of the method, a decision is made as to the position into which the cock system is to be brought, that is to say whether liquid is to be sucked in or discharged or the cylinder is to be closed. In a further step, depending on the decision, the cock system is brought into a predetermined settable position in such a way that either the at least one orifice in the cylinder bottom is brought into congruence with the orifices of the cock element for sucking in or discharging the liquids or all the orifices of the cylinder bottom are closed.

Particularly advantageously, in a first embodiment of the invention, a cock element is brought into a sealing closing position with all the orifices of the cylinder bottom for the simultaneous closing of all the orifices in the cylinder bottom. Alternatively, in a second embodiment, valves in the orifices of the cylinder bottom can also be activated in order to close all the orifices in the cylinder bottom.

Particularly advantageously, the cock system is brought into the predetermined settable position in a controlled way by means of a control arrangement. It is also conceivable, however, to bring the cock system into the desired position manually.

Preferably, further, the position of the cock element is checked by means of a measurement arrangement. The measurement arrangement may consist, for example, in each case of a Hall sensor for each of the settable positions, so that controlled operation is possible.

BRIEF DESCRIPTION OF THE DRAWINGS

Preferred embodiments of the invention are explained below by means of drawings in which.

DESCRIPTION OF THE PREFERRED EMBODIMENTS

Figure 1:
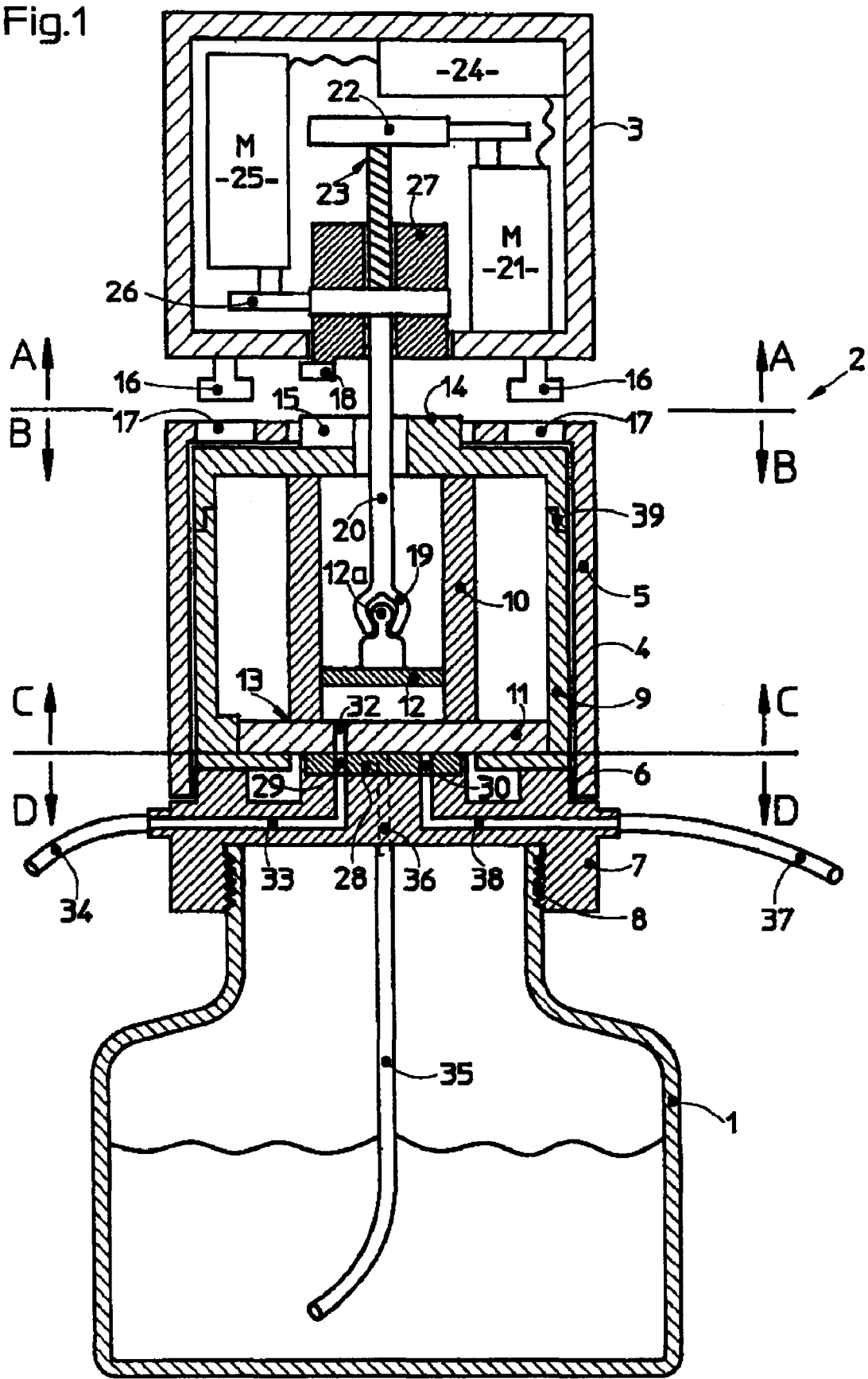
FIG. 1 shows a diagrammatic illustration of a volume measurement and metering device having the features of the invention in section.

According to FIG. 1, a volume measurement and metering device 2 is screwed on a container 1 and consists of an actuation device 3 and of a cylinder/piston and cock system 4. The system 4 has a cylindrical housing 5 which is connected to a cylindrical attachment part 7 via a bayonet fastening 6 (or else via a threaded connection). The attachment part 7 is screwed onto the container 1 by means of an internal thread 8, if appropriate with an intermediate ring. A cylindrical fastening device 9 is mounted rotatably in the housing 5. The housing 5 holds a cylinder 10 and a cylinder bottom 11 together non-positively in such a way that, during the displacement of a piston 12, no liquid emerges in the sealing region 13 between the cylinder bottom 11 and the cylinder 10.

Figure 2:
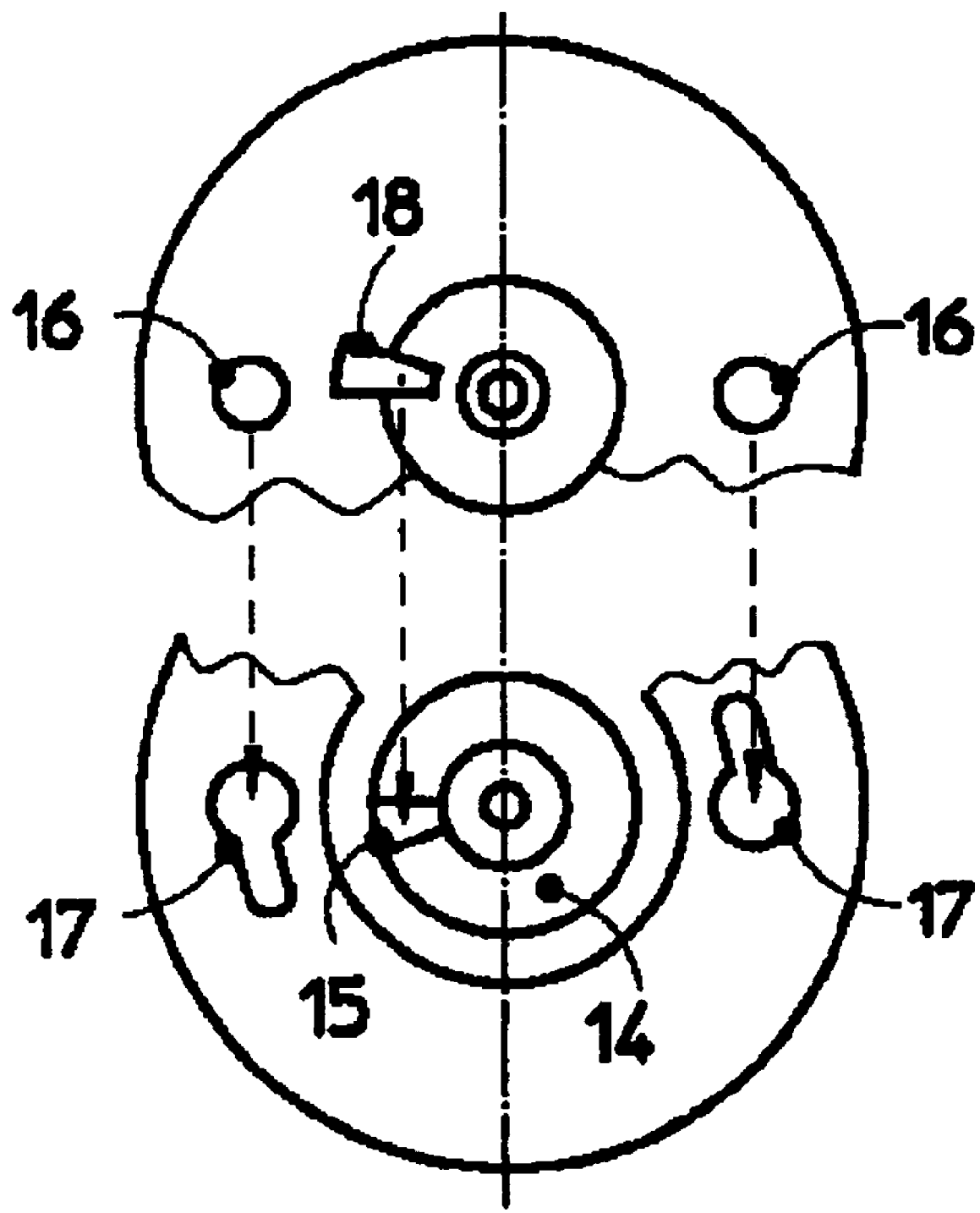
FIG. 2 shows a top view of the actuation device and the cylinder/piston/cock system in the direction of the arrows AA and B-B in FIG. 1.

The fastening device 9 is provided on its top side with a projection 14 which has a groove 15 (FIG. 2).

In FIGS. 1 and 2, the fastening device 3 and the cylinder/piston/cock system 4 are illustrated separately for illustrative purposes. During operation, the actuation device 3 is connected positively to the system 4 by means of bolts 16 which engage into long holes 17. In this case, a driver 18 moves so far into the groove 15 as to result in a positive rotary connection. At the same time, a coupling element 19 engages over a coupling ball 12a, so that the piston 12 is connected to the drive shaft 20. As soon as this connection is made, the piston 12 can be raised or lowered by means of a motor 21 in the actuation device 3. For this purpose, the motor 21 is connected to the drive shaft 20 via a gear 22. The gear 22 engages by means of a thread around the drive shaft 20 provided with an external thread 23, so that, as a result of thread engagement, the drive shaft 20 mounted fixedly in terms of rotation can be raised or lowered.

The motor 21 is supplied via an automatic control arrangement 24, so that the stroke travel of the piston 12 is coordinated with the volume to be conveyed. The control arrangement 24 may in this case be controlled in a known way by an internal or external operation device, for example even a microprocessor. In the actuation device 3, a second motor 25 is provided, which by means of a gearwheel 26 drives a cylindrical sleeve 27 to which the driver 18 is fastened in one piece. As soon as the sleeve 27 rotates, this rotational movement is transmitted via the driver 18 and groove 15 to the fastening device 9 and consequently to the cylinder 10 and the cylinder bottom 11.

Figure 3:
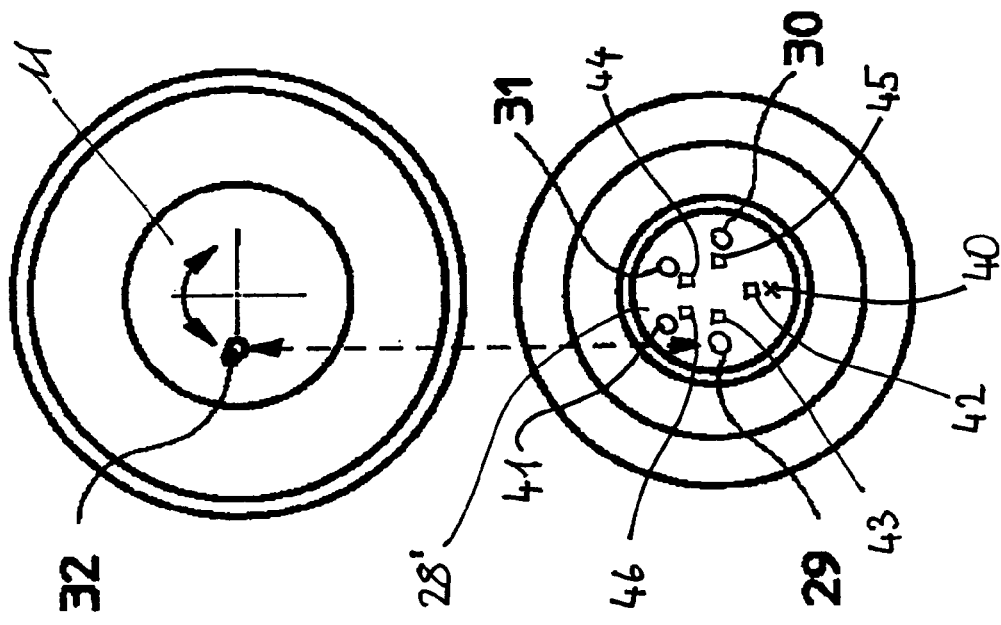
FIG. 3 shows a section in the plane C-C and D-D in FIG. 1.

The cylinder bottom is pressed with a sealing seat against a cock element 28 by the housing 5. Located in the cock element 28 are duct orifices 29, 30, 31 and 41 (FIG. 3) which, depending on the rotary position of the cylinder bottom 11, can be brought alternately into congruence with an orifice 32 in the cylinder bottom 11. When the cylinder 10 is to be closed, the cylinder bottom 11 is brought into a closing position with respect to the cock element 28. In the closing position, a closing point 40 is in congruence with the orifice 32 of the cylinder bottom 11. In this cock element 28, the orifices 29, 30, 31 and 41 are arranged symmetrically about the center of the cock element 28. The closing point 40 is located between the orifices 29 and 41.

Each orifice 29, 30, 31 and 41 and also the closing point 40 are assigned in each case a Hall sensor 42, 43, 44, 45 and 46. The Hall sensors 42, 43, 44, 45 and 46 are connected operatively to the control arrangement 24. Whenever a new position of the cock element 28 is set, the control arrangement 24, by means of the signals from the Hall sensors 42, 43, 44, 45 and 46, checks whether the position has been assumed correctly. As soon as the cock element 28 is in the correct position in relation to the cylinder bottom 11, the motor 25 is stopped. This ensures that, in the closing position, the orifice 32 of the cylinder bottom 11 is closed sealingly, whilst, in the other positions, the orifices 29, 30, 31 and 41 are brought exactly into congruence with the orifice 32 of the cylinder bottom 11.

If a plurality of closing positions are desired, additional closing points could be defined in the cock element 28 by means of additional Hall sensors.

In the position according to FIG. 1, the chamber contents of the cylinder 10 communicate, via the orifice 32 in the cylinder bottom 11 and the orifice 29 in the cock element 28, with a duct 33 which is connected to a hose 34. The contents of the cylinder 10 can therefore be expelled through the hose 34.

If, for example, in a next work step, liquid is to be sucked into the cylinder 10 out of the container 1 via a hose 35, the motor 25 is actuated and, via the gearwheel 26, sleeve 27, driver 18, groove 15 and fastening device 9, rotates the cylinder 10 and cylinder bottom 11 about the longitudinal axis in such a way that the orifice 32 in the cylinder bottom 11 is in alignment with the orifice 31 in the cock element 28. In this rotary position, the interior of the cylinder 10 communicates with the hose 35 via a duct 36. By the motor 21 being actuated and by the piston 12 being raised by means of the drive shaft 20, liquid can be sucked up out of the container 1. If the liquid received in the cylinder 10 is subsequently to be discharged via a hose 37, the fastening device 9 merely has to be rotated by means of the motor 25 in the way already described and the orifice 32 thereby brought into congruence with the orifice 30, so that the cylinder communicates with a duct 38 which is connected to the hose 37.

If the cylinder contents are to be separated from the environment intermediately, the cock element 28 is brought into the closing position in relation to the cylinder bottom 11, so that the closing point 40 is in congruence with the orifice 32 of the cylinder bottom. Thus, for example, reaction can take place, unaffected by external influences, in the cylinder 10.

In order to mount the fastening device 9 rotatably in the housing 5, at least the fastening device 9 is produced from a slide-able material (plastic). The fastening device 9 is in this case formed in two parts and can be separated at a connection point 39, so that the cylinder 10 and piston 12 are easily accessible. Correspondingly, for example for cleaning purposes, the entire arrangement can easily be opened. The cylinder bottom 11 and cylinder 10 may be produced from ground ceramic material. The cylinder 10 may also be manufactured from glass or from suitable plastic.

Figure 4:
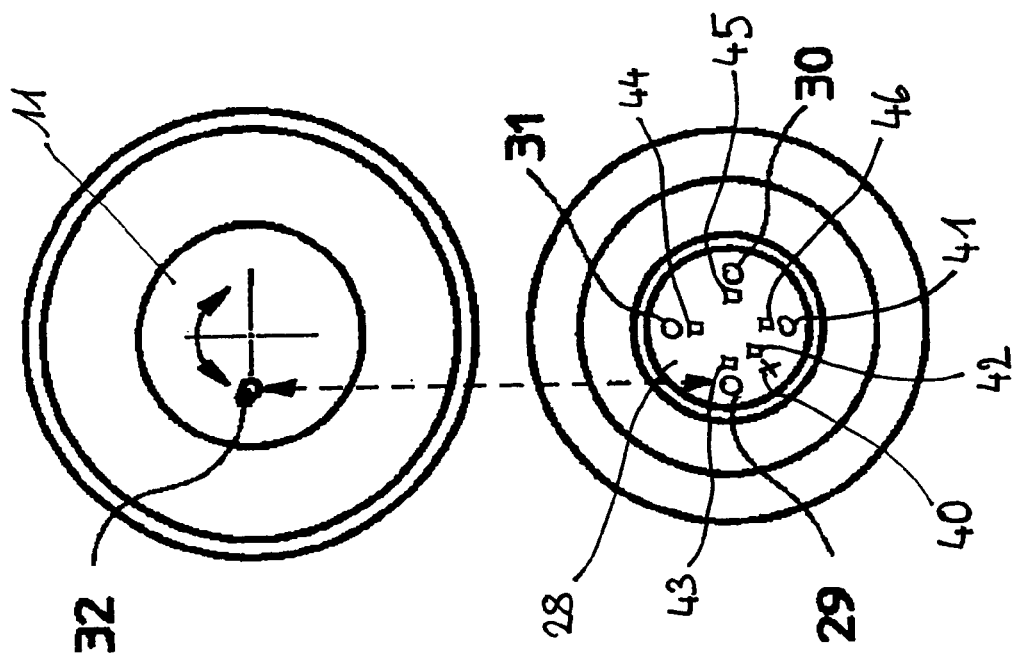
FIG. 4 shows an alternative device in a section in the plane CC and D-D in FIG. 1.

FIG. 4 illustrates an alternative cock element 28' in a section in the plane C-C and D-D from FIG. 1. As is evident from FIG. 4, the cylinder bottom 11 is identical to that from FIG. 1. In the cock element 28', however, the orifices 29, 30, 31 and 41 are arranged asymmetrically and opposite the closing point 40. To each orifice 29, 30, 31 and 41 and also the closing point 40 there is again assigned a Hall sensor 42, 43, 44, 45 and 46, by means of which the correct position of the cock element 28' is checked. The advantage of the asymmetric arrangement in the cock element 28' is that sufficient space is available for the closing point 40. The sealing function of the cock element 28' is thereby improved.

The arrangements shown in the exemplary embodiments are, of course, not restricted to there being only a single orifice 32 in the cylinder bottom. It is left to a person skilled in the art to decide how many such orifices are to be provided in the cylinder bottom 11 or in the cock element 28 according to the particular application. Due to the disc-shaped arrangement, even complicated cock arrangements with a large number of communicating orifices or ducts and with different numbers of closing points can in this case be optimally implemented in a simple way and with the least possible outlay. The cock in this case consists, in principle, only of the cock element 28 and of the cylinder bottom 11. Both are accessible in a simple way, can be cleaned simply and are also exchangeable.

What is claimed is:

1. Volume measurement and/or metering device with a cylinder/piston and cock system for sucking in and/or discharging liquids in a defined way, a piston being movable in relation to a cylinder for sucking in or discharging liquid, the cylinder being mounted, together with a cylinder bottom, rotatably with respect to the cock system about an axis of rotation parallel to a cylinder longitudinal axis, the cylinder bottom bearing with a sealing seat against a cock element of the cock system having at least one duct orifice, and these orifices being arranged in such a way that the at least one orifice in the cylinder bottom can be brought into congruence alternately with the orifice or orifices of the cock element when the cylinder and cylinder bottom are rotated, wherein means for the simultaneous closing of all the orifices of the cylinder bottom are provided, and whereby all the orifices of the cylinder bottom are closed by the cock element.

2. Device according to claim 1, wherein a control arrangement for controlled setting of the positions of the cylinder bottom relative to the cock element is provided.

3. Device according to claim 1, wherein a measurement arrangement for determining the at least one closing position of the cylinder bottom relative to the cock element is present, so that controlled operation of the device is possible.

4. Device according to claim 1, wherein the orifices are arranged asymmetrically in the cock element.

5. Device according to claim 1, wherein a valve is provided for closing the at least one orifice in the cylinder bottom.

6. Method for operating a volume measurement and/or metering device with a cylinder, piston and cock system for sucking in and/or discharging liquids in a defined way, the piston being moved in relation to the cylinder for sucking in or discharging liquid, the cylinder being mounted, together with a cylinder bottom, rotatably with respect to the cock system about an axis of rotation parallel to a cylinder longitudinal axis, and the cylinder bottom bearing with a sealing seat against a cock element of the cock system having at least one duct orifice, wherein the cock system is brought into predetermined settable positions in such a way that either the at least one orifice in the cylinder bottom is brought into congruence with the orifices of the cock element for sucking in or discharging the liquids, or that the at least one orifice in the cylinder bottom is closed, and wherein the cylinder bottom is brought into such a position relative to the cock element that the cock element is in a sealing closing position with all orifices of the cylinder bottom, thereby simultaneously closing all the orifices of the cylinder bottom.

7. Method according to claim 6, wherein the cock system is brought into the predetermined settable position in an automated way by means of a control arrangement.

8. Method according to claim 6, wherein the position of the cylinder bottom relative to cock element is checked by means of a measurement arrangement.

* * * * *